2 Sheets—Sheet 1.

B. F. RICE.

Paper Bag Machine.

No. 920. Reissued March 6, 1860.

Witnesses:
J. Hiscell Jr.
Chas. H. Morgan.

Inventor:
Benjamin F. Rice

THE NORRIS PETERS CO., PHOTO-LITHO., WASHINGTON, D. C.

2 Sheets—Sheet 2.

B. F. RICE.

Paper Bag Machine.

No. 920.

Reissued March 6, 1860.

Witnesses:
J. Shissell Jr.
Chas. H. Morgan.

Inventor:
Benjamin F. Rice.

THE NORRIS PETERS CO., PHOTO-LITHO., WASHINGTON, D. C.

UNITED STATES PATENT OFFICE.

BENJAMIN F. RICE, OF CLINTON, MASSACHUSETTS, ASSIGNOR, BY MESNE ASSIGNMENTS, TO CHARLES H. MORGAN, LEONARD WHITNEY, JR., AND THURSTON PRIEST.

IMPROVEMENT IN MACHINES FOR MAKING PAPER BAGS.

Specification forming part of Letters Patent No. 17,184, dated April 28, 1857; Reissue No. 920, dated March 6, 1860.

*To all whom it may concern:*

Be it known that I, BENJAMIN F. RICE, of Clinton, in the county of Worcester and the State of Massachusetts, have invented a certain new and useful Machine for Making Paper Bags, Tubular File-Slips, &c., whereby paper bags of a novel and superior form are made cheaper and more expeditiously than by other methods hitherto in use.

The nature of my invention consists in organizing and constructing a paper-bag machine so as to produce paper bags from a long sheet or roll of paper by a connected series of automatic operations, whereby the paper is formed into a tube and its edges pasted. Said tube is severed into successive pieces of suitable length for forming bags, the severance being effected in such a way as to avoid waste and shape the paper for composing bags so as to leave at each end thereof one side of the tube projecting beyond the other, the projecting portion of one end being used as a lap for closing the bottom of the bag, while the projecting portion at the other end serves to facilitate the opening of the mouth of the bag for use. The laps or projecting portions of the bottom ends are successively turned over and pasted down to close the bags, and the bags are discharged from the machine.

A part of my invention consists in binding a continuous sheet of paper (as drawn from a roll) progressively around a supporting-bar and into a tubular form by means of suitable rolling and fixed guides.

A part also consists in giving the paper during the interval of time between each succeeding severance of the same a gradually-accelerated motion for nearly one-half of the said intervening time, and a gradually-retarded motion for the remainder, whereby the inertia and momentum of a heavy roll of paper are overcome with facility at high speed without tearing the paper or pulling off an excess of the same, which a sudden start or stop would endanger.

A part also consists in severing the paper tube slantwise with its length while distended or partly so by the supporting-bar before alluded to.

This method is embodied in my paper-bag machine; and I hereby declare that the following is a full, clear, and accurate description of the same, reference being had to the accompanying drawings, which form a part of this specification, and in which—

Figure 1 represents an elevation of one side of my paper-bag machine. Fig. 2 is an elevation of the other side thereof; Fig. 3 represents a plan thereof; Fig. 4 a vertical longitudinal section thereof. Figs. 5, 6, 7, 8, 9, 10, 11, and 12 are views of certain detached parts of the machine. Figs. 13 and 14 represent paper tubes formed at a certain stage in the manufacture of bags. Fig. 15 represents a complete bag. Fig. 16 represents a developed tube or bag and shows the form into which paper is cut for bags by this machine.

Similar letters of reference indicates corresponding parts in the several figures.

The various operations of this machine in the manufacture of bags may be divided into three classes, as follows: The tube-forming, the tube-severing, and bottom-forming operations, the mechanism for effecting which I will proceed to describe.

*d d* represent standards which support the paper-roll spindle $q^2$, the creasing-rolls $n^2$ $o^2$, the guide-bar $p^2$, and the tube-supporting bar *e*.

Figure 1:
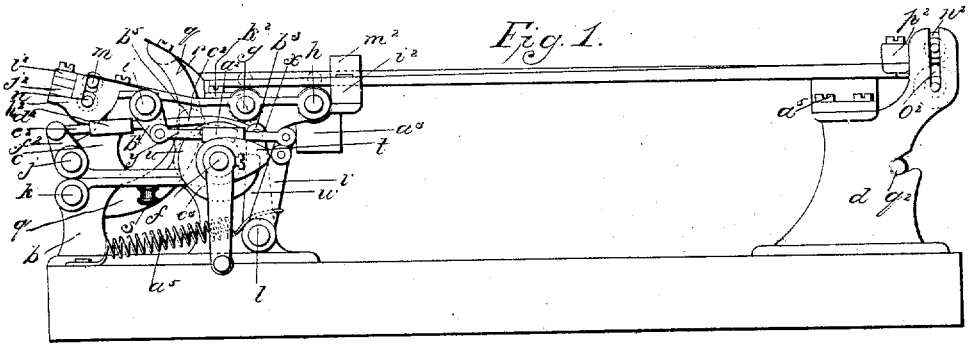
Figure 3:
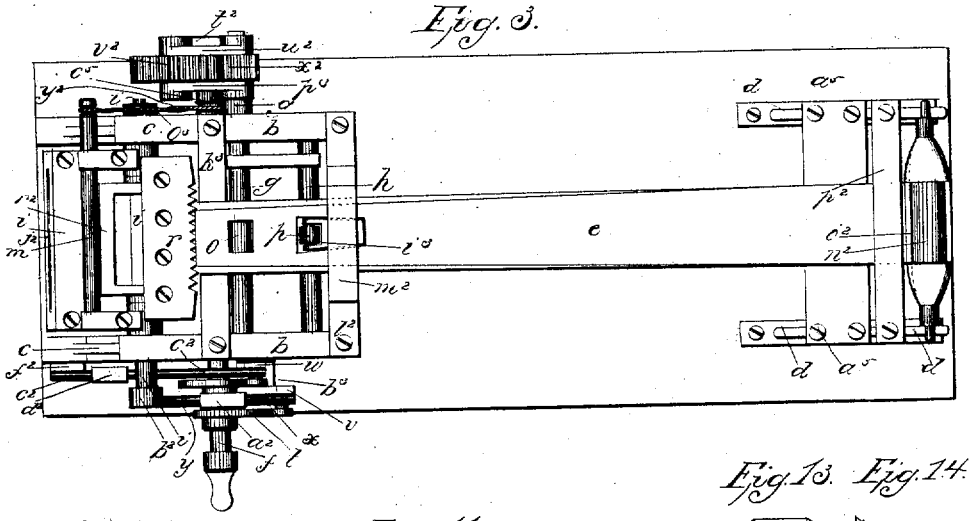

$a^3$ is a dish containing paste or gluten; $l^3$, a thin wheel for supplying paste to one edge of the paper; *p*, a roll provided with spring $i^3$, which presses the roll *p* upon the paste-wheel $l^3$; *g* is the feed roll shaft, which revolves in its bearings in the standards *b b*, and receives its motion from the driving-shaft *f* by means of a train of gearing hereinafter to be described. $k^3$ is a feed-roll attached to the shaft *f*. *o* is a feed-roll acting in connection with the roll $k^3$, and has its bearings in the bar *e*. The bar *e* should be of metal, and of sufficient thickness to transmit to the feed-roll *o* the required pressure, which is obtained by means of the screws $a^5$ without deflection.

The operation of the tube-forming apparatus thus far described is as follows: A roll of paper of proper width to form a tube of the required size having a lapped joint or seam is placed upon the spindle $q^2$. The paper is drawn between the creasing-rolls $n^2$ $o^2$, which are formed so as to crease the paper to facilitate its forming into a tube. From thence, under the guide-bar $p^2$, over and around the bar $e$, bending progressively till, by means of the guide-bars $l^2$ $m^2$, it is made to nearly inclose the bar $e$. As the paper passes through the throat in the guide-bars and between the same and the bar $e$, one edge is made to pass through the kerf or slit $j^3$, for the purpose of guiding it clear of the paste-wheel $l^3$. The other edge of the paper passes between the press-roll $p$ and the paste-wheel $l^3$, which revolves in the paste-dish $a^2$, receiving therefrom sufficient paste to cement the seam. As the paper advances from this point or position, the edge passing through the kerf $j^3$ is closed upon the pasted edge by the feed-rolls, thus completing the formation of the tube.

The feed-rolls which give motion to the paper while being formed into a tube are operated by a peculiarly-arranged mechanism, which may be described as follows: The driving-shaft $f$ has fastened to one of its ends a crank, $r^3$. To this crank a cog-wheel, $w^2$, is firmly attached by the crank-pin $n^3$, so that it can have no movement except as it is carried around by the revolution of the shaft; and it is arranged upon the crank in such a relative position to the shaft that a prolongation of the axial line of the shaft $f$ would touch its pitch-circle. $v^2$ is an intermediate cog-wheel, which communicates motion from the cog-wheel $w^2$ to the cog-wheel $x^2$, fastened to the feed-shaft $g$, in order that the cog-wheel $v^2$ may be kept in working contact with the cog-wheel $x^2$ and with the cog-wheel $w^2$ in its constantly-varying position. Their axes are connected by the links $t^2$ $u^2$ $p^3$, in which they are free to turn. By the action of mechanism arranged as just described the feed-rolls $k^3$ $o$ receive an accelerated motion for nearly three-eighths of a revolution of the driving-shaft $f$, a retarded motion for nearly three-eighths of a revolution, and are very nearly stationary for the remaining one-fourth of the revolution of the said shaft, during which time the severing apparatus is brought into action, the several parts of which I will proceed to describe.

Figure 4:
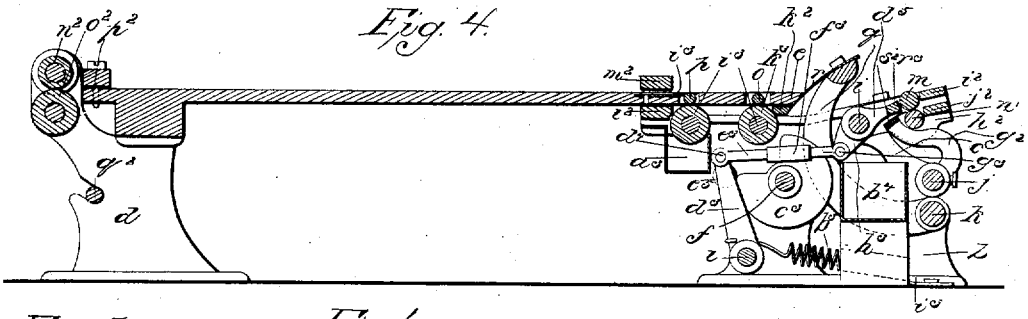
Figure 5:
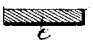
Fig. 5 represents a transverse section of the bar *e*. Near the end attached to the standards *d d*, $l^2$, $m^2$ are other guide-bars, which are formed with a throat, and which inclose the bar *e*.
Figure 6:
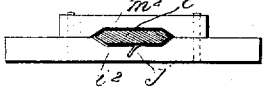
Fig. 6 represents a transverse section of the bar *e*, near the guide-bars $l^2$ $m^2$, and also the manner in which the bar *e* is inclosed by them.
Figure 7:
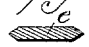
Figure 12:
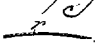
Figure 16:
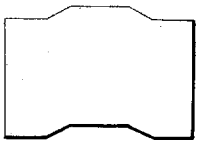
Figure 8:
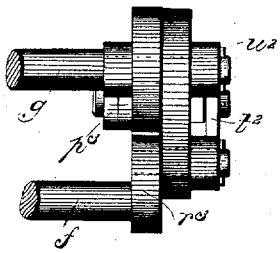
Figure 9:
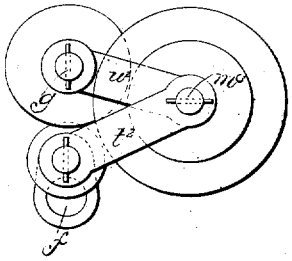

$r$ is the severing-blade, which has a serrated edge. Said blade is attached to a swing-frame having radial arms $q$ $q$, which connect it with the shaft $k$. $c^3$ is a cam upon the main shaft, and actuates the cutter by means of a roller on one of the said radial arms. $k^2$ (see Fig. 4) forms one stationary blade and the end of the tube-forming bar $e$ forms another stationary blade, against which the paper tube is cut off.

Figures 13, 14:
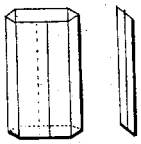
Figure 15:
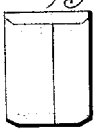
Figure 2:
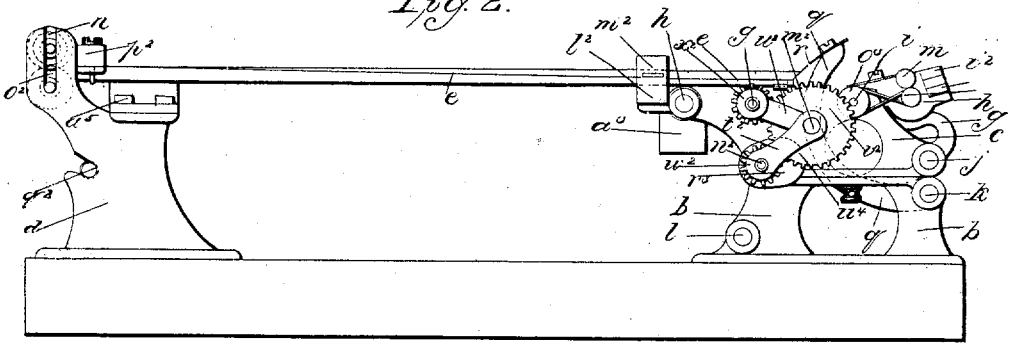

The tube-severing mechanism just described is made to operate with relation to the tube-forming mechanism already described, so that when the feed-rolls $o$ $k^3$ come nearly to a stop, the blade $r$ is made to pass in a circular arc by the end of the bar $e$ and the blade $k^2$ by means of its cam $c^3$, and the roller $b^5$ fitted to one of the radial arms of the swing-frame and returns to its elevated position. By this operation a portion of tube of the required length protruding from the end of the tube-forming bar $e$ is cut off slantwise, as shown in Figs. 13 and 14, which represent one of the severed portions of the required shape for the formation of bags.

The mechanism for pasting and folding the bottom seam of the bag I will now proceed to describe. (See Figs. 1, 2, 3, and 4.) $c$ $c$ are stands on either side of the machine, which support the bottoming mechanism. $s$ $s$ are clamp-bolts for confining the standards $c$ $c$ to the standards $b$ $b$ in such positions as may be required to make bags of different lengths. $b^4$ is a dish or vat for holding paste; $j$, a shaft to which the crank $f^2$ and the curved arms $g^2$ $g^2$ are keyed; $s^2$, a pasting and folding blade affixed to the arms $g^2$ $g^2$; $u$, a cam on the main shaft which operates the paste-blade $s^2$; $w$, a rocker-arm having a roller, $b^3$, which is kept in working contact with the cam $u$ by means of a spiral spring. $e^2$ $d^2$ $c^2$ is an adjustable link which connects the rocker-arm $w$ to the crank $f^2$. $h^2$ $h^2$ are arms keyed to the shaft $i$; $m$ $n$, rolls having their bearings in the arms $h^2$ $h^2$, and having motion in a circular arc around the shaft $i$ and rotating upon their own axes. The motion in a circular arc is given by means of the cam $t$, the rocker-arm $v$, the adjustable connecting-link $y$ $a^2$ $x$, crank $b^2$, shaft $i$, and arms $h^2$ $h^2$. The rolls are made to revolve by means of a pulley, $c^5$, keyed to the main shaft $f$, the band or cord $y^2$, which passes over the pulley $o^3$, which revolves loosely on the end of the shaft $i$ and around the roll $n$. $i^2$ $j^2$ are blades attached to the arms $h^2$. $r^2$ is a pressing-bar attached to radial arms $d^5$, which are free to move around the shaft $i$ and independent of the same. The pressing-bar $r^2$ receives its motion by means of the cam $t$, the roller $e^5$, the rocker-arm $d^3$, the adjustable connecting-link $e^3$ $f^3$ $g^3$, the crank $h^3$, which is extended from the hub of one of the presser arms.

The various parts of this bottoming mechanism being adjusted in proper relation to each other and in harmony with the feeding motion hereinbefore described, its operation is as follows: When the feeding-rolls $k^3$ $o$ have protruded a sufficient length of tube for the formation of a bag and the motion of the said feeding-rolls ceases preparatory to the operation of the severing-blade $r$, the tube is grasped by the blade $s^2$ and the pressing-bar $r^2$ so near its end that the projecting portion of the tube for closing the bottom of the bag overhangs the edge of the blade $s^2$. The functions of the pressing-bar $r^2$ and the blade $s^2$ are, first, to hold the tube in its proper position while being cut off; and, secondly, to apply paste for the bottom seam by pressing the tube upon the blade $s^2$, which receives a coating of paste immediately after the completion of each bag by being carried down into the paste-dish $b^4$ by the action of its cam; and, lastly, to act in holding the tube, as the rolls $m$ $n$ have a movement in a circular arc down around the shaft $i$, by the action of their cam, by which movement the roll $n$ is brought downward and folds the lap as it passes the edge of the blade $s^2$. Said roll and blade keep in close contact till the rolls have moved down far enough, when the blade $s^2$ inserts the bag between the rolls. Said rolls press the bottom seam together and discharge the bag from the machine.

Figure 10:
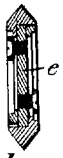
Figure 11:
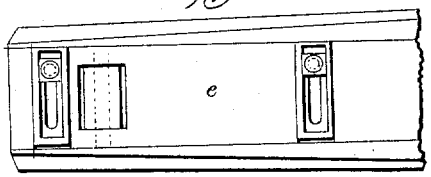

In order to adapt the machine to the formation of tubes or bags of various widths, the tube-supporting bar $e$ is made adjustable, as shown by Figs. 10 and 11, to the required widths. Any variation of the width of the said tube-supporting bar must be attended by a corresponding change in the guide-bars $l^2$ $m^2$, and also of the creasing-rolls $n^2$ $o^2$ when the latter are used. The machine will, however, make bags without creasing the paper by the rolls $n^2$ $o^2$, and the upper one, $n^2$, may be dispensed with.

In order to adapt the machine to the manufacture of bags of varying length, the cog-wheels $w^2$ $x^2$, by means of which the feed-rolls are operated, must be replaced by other cog-wheels of different relative diameters, as may be required to deliver different lengths of tube for the required length of bag. Any change in the length of the tube delivered must be attended with a corresponding change in the position of the bottom-closing mechanism relatively to the end of the bar $e$, or the point of severence, which is accomplished by sliding the stands $c$ $c$ upon the standards $b$ $b$ and confining them by the clamp-screws $s$ in the required position and adjusting the length of the band $y^2$ and the several connecting-links thereto.

In order to make "tubular file-slips" (by which term I mean short, flat tubes open at each end) with this machine simply the bottom closing mechanism is thrown out of gear. The severing-blade also may be adjusted to cut off the tube at a right angle with its length, and thus avoid the overlapping ends, if desired.

Having thus briefly described my invention and pointed out some of its modifications, what I claim as my invention, and desire to secure by Letters Patent, is—

1. The machine as a whole composed of mechanism for forming, feeding, cutting, and pasting the tube or bag, combined, arranged, and operating substantially as described.

2. The use of a supporting bar or its equivalent, around which paper may be formed into a tube, and in connection with which the said paper tube may be severed, each and the whole substantially as described.

3. Giving the paper the variable feeding motion, for the purpose and in the manner substantially as described.

4. Cutting the paper without waste of material into such a form as shall have suitable projections for the formation of the bottom lap or seam of the bag, and for the convenient opening of the bag at the mouth, substantially as described.

BENJAMIN F. RICE.

Witnesses:

J. THISSELL, JR.,

CHAS. H. MORGAN.